ROBERT B. POPPE
VICTOR F. GUGLER
INVENTORS

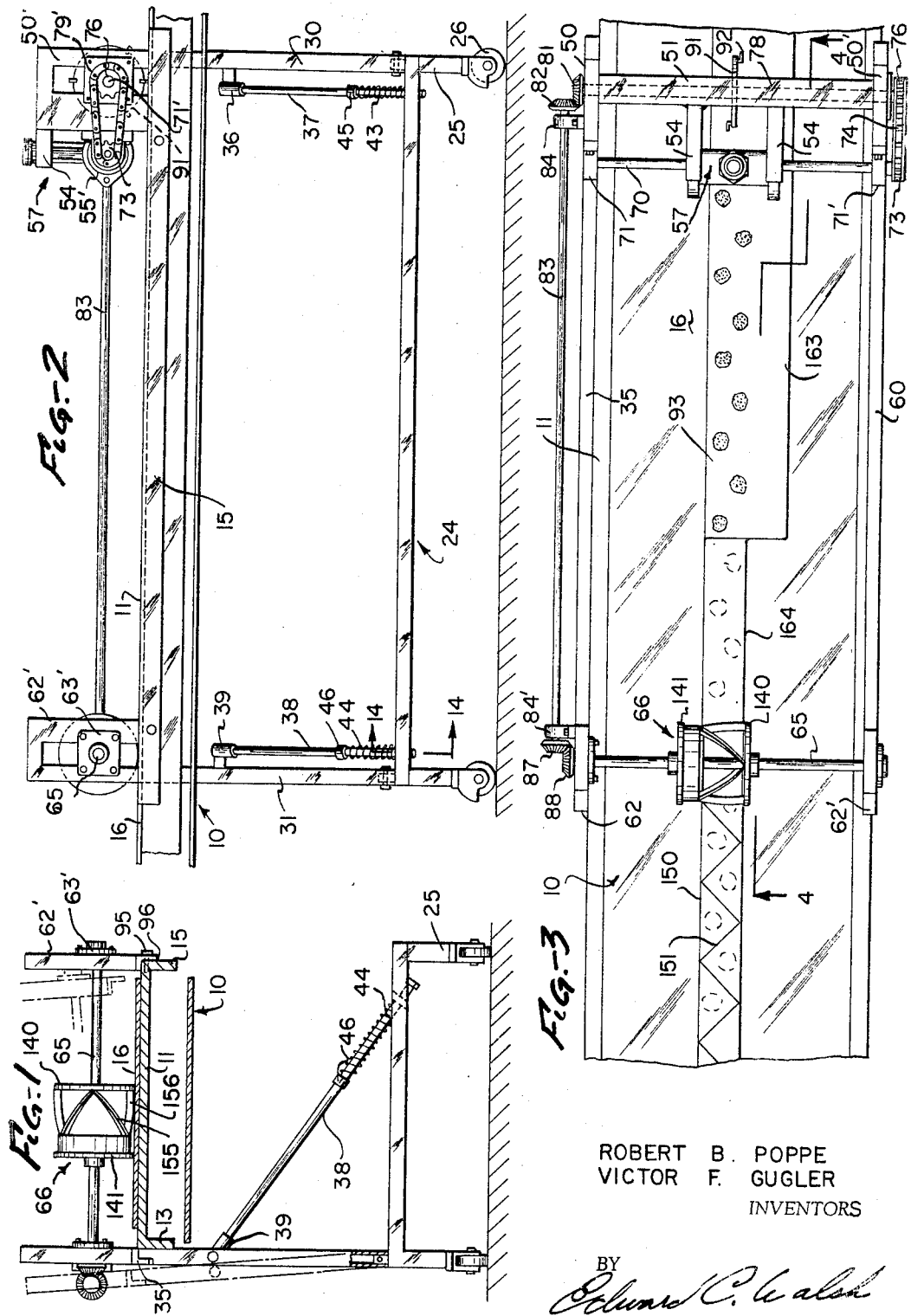
Oct. 11, 1966     R. B. POPPE ETAL     3,277,845
PASTRY MACHINE
Filed Oct. 3, 1963     5 Sheets-Sheet 1
ROBERT B. POPPE
VICTOR F. GUGLER
INVENTORS
BY
ATTORNEY Oct. 11, 1966  R. B. POPPE ETAL  3,277,845
PASTRY MACHINE
Filed Oct. 3, 1963  5 Sheets-Sheet 2
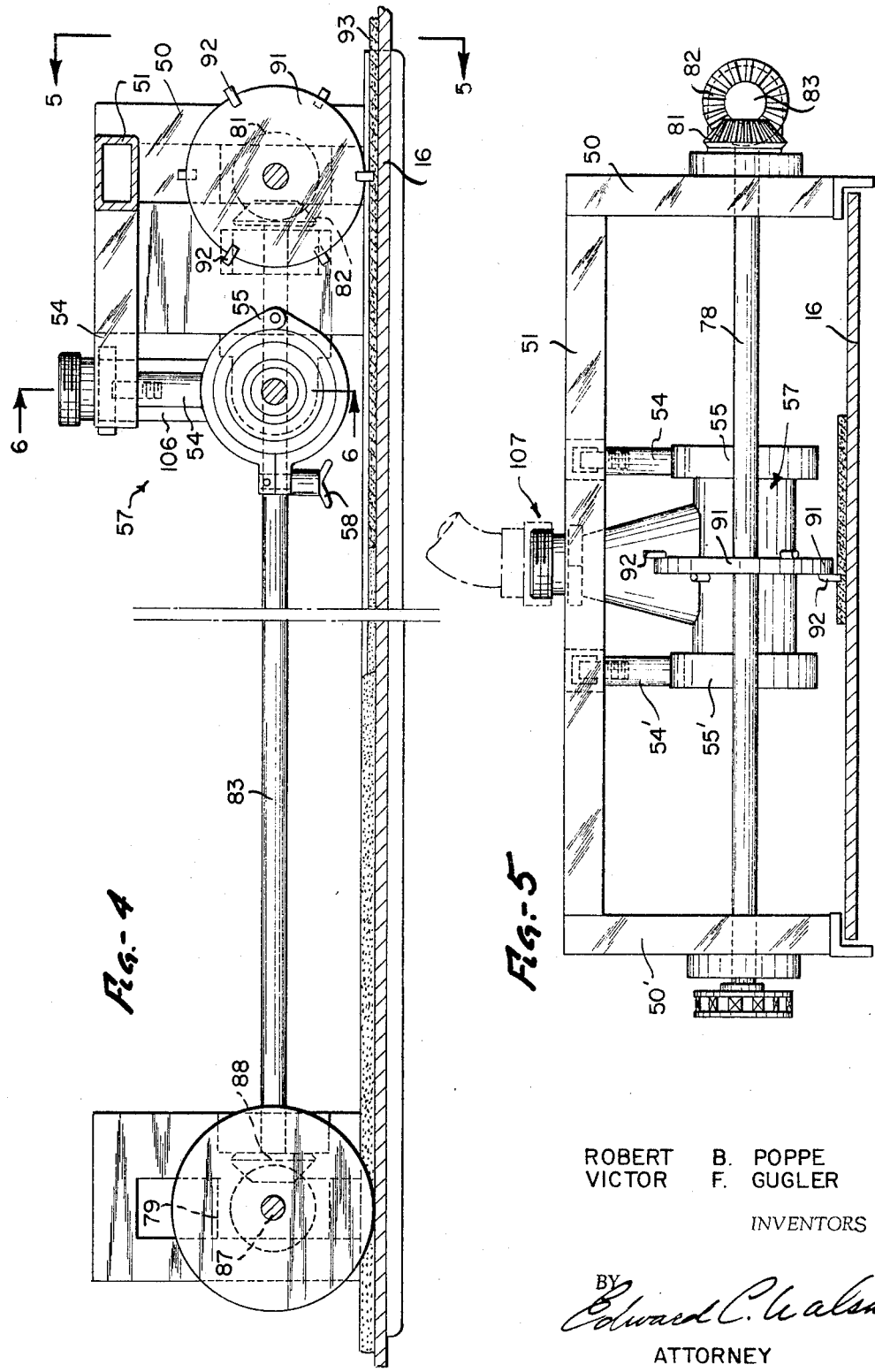
ROBERT B. POPPE
VICTOR F. GUGLER
INVENTORS
BY Edward C. Walsh
ATTORNEY

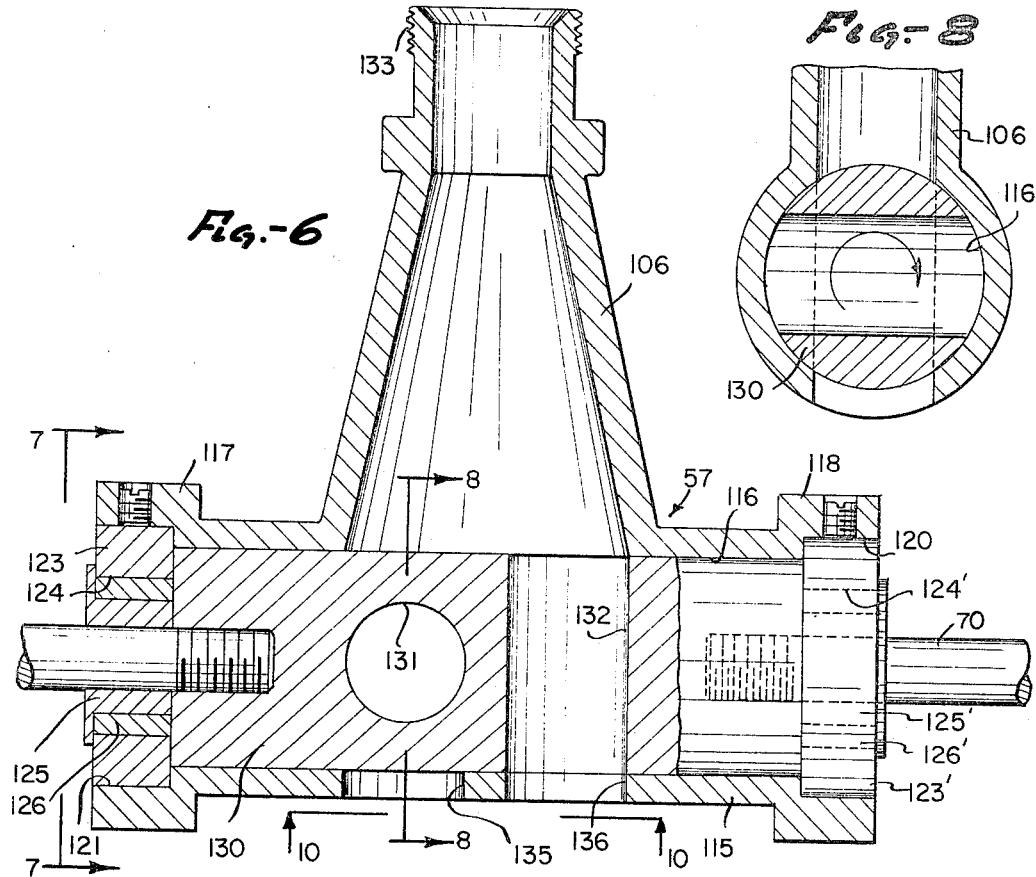
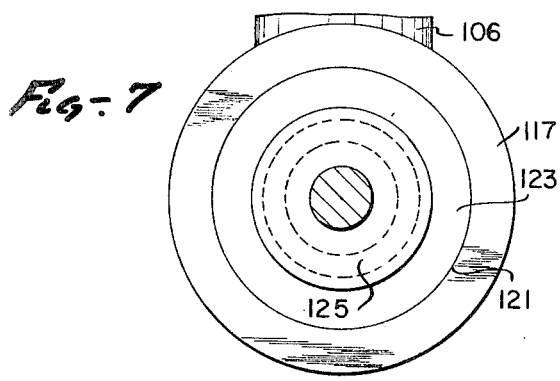
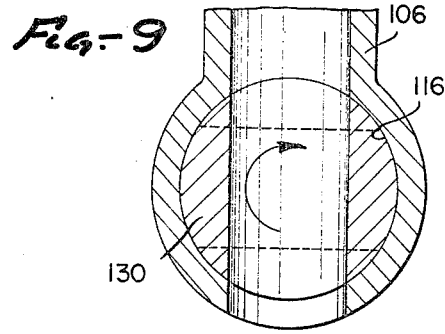
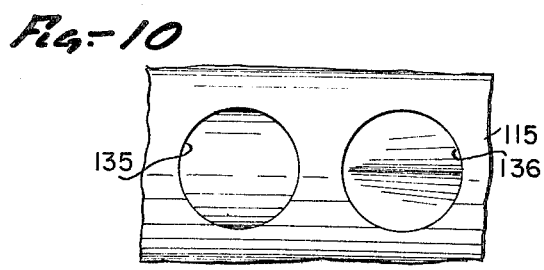

BY Edward C. Walsh
ATTORNEY

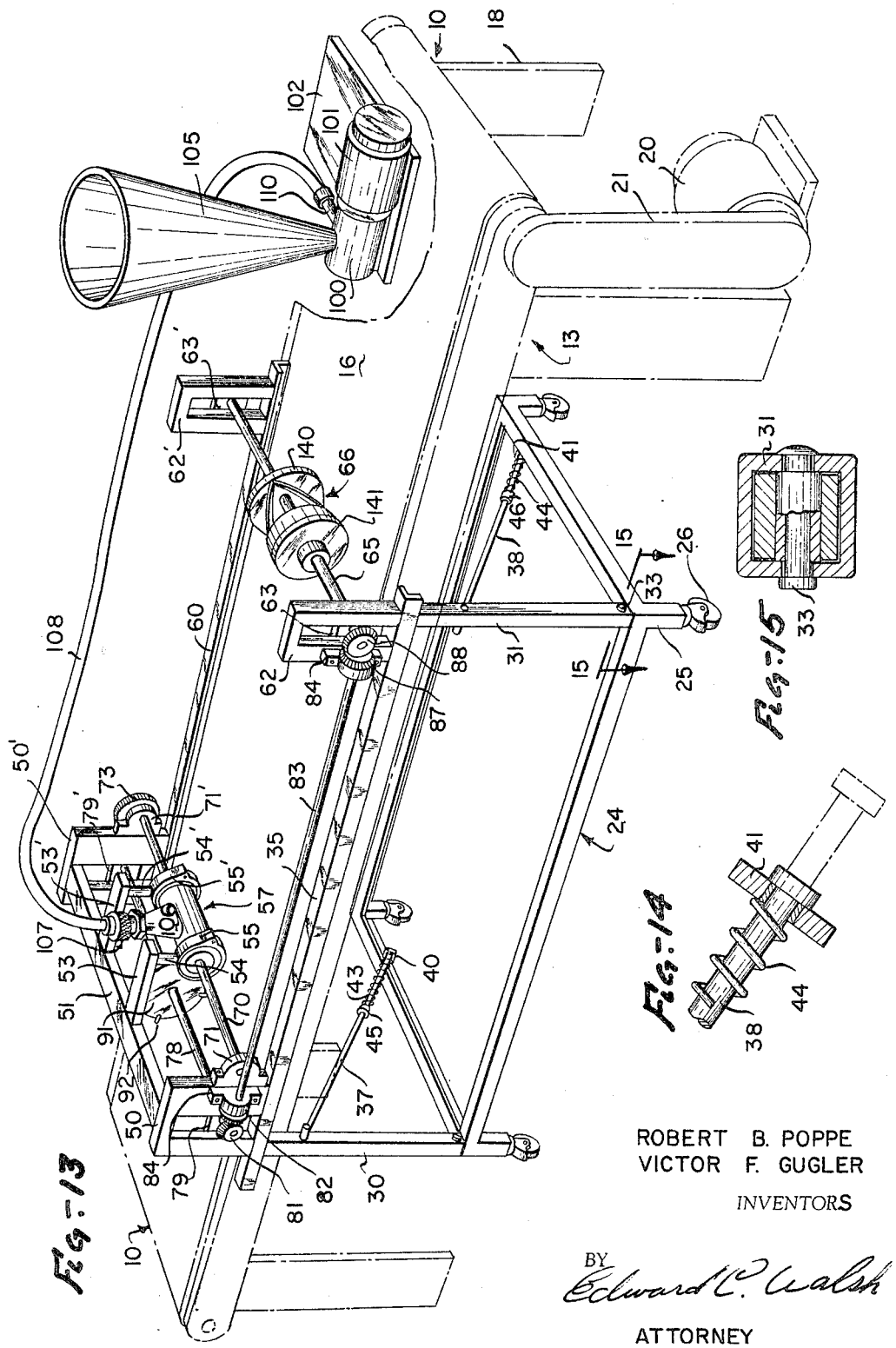

United States Patent Office 3,277,845
Patented Oct. 11, 1966

3,277,845
PASTRY MACHINE
Robert B. Poppe, 14875 Gale Ave., Hacienda Heights, Calif., and Victor F. Gugler, 8920 Helen St., Sun Valley, Calif.
Filed Oct. 3, 1963, Ser. No. 313,696
9 Claims. (Cl. 107—1)

This invention relates to an improved machine, mechanism and method for the preparation of pastry products, particularly pastry products of the type having a filler material in them, such as a fruit preparation. The machine has particular adaptability and utility in the preparation of apple turnovers, although it is not limited to use therewith. The method is adapted to making various types of pastry products, particularly apple turnovers.

The invention has certain other broader aspects adaptable to the automation of certain operations, including the method of the invention in connection with conveyor belts. In various types of processing, operations are carried out on a material while it is being moved along a conveyor belt. The herein invention embraces the concept of providing a machine or apparatus carrying processing mechanism or equipment for operating on the material while it is being conveyed by the conveyor belt, the concept including that the equipment for processing carried by the machine or apparatus is driven by the conveyor belt itself. That is, the machine or apparatus carrying the equipment for processing can be moved up to any standard conveyor means having an endless belt, put in position with respect to the moving belt and it is then driven by the belt. Thus, this apparatus or equipment can be moved up to any conveyor belt and moved away from it. The conveyor belt is driven by power means and since the conveyor belt then drives the processing equipment, this equipment needs no source of power of its own. It is easily movable to other areas for cleaning or other attention.

In the invention as described above for processing pastry materials, in a preferred exemplary form thereof as disclosed herein, additional driven means are provided for punching or otherwise providing depressions in the pastry material adapted to receive the filler material. These operations are in addition to the actual filling and cutting operations utilized in the preparation by way of example of apple turnovers.

From the foregoing general description of the nature of the invention, its objects will be readily apparent. The primary object is to provide improved and effective means for automating the processing necessary in the preparation of pastry and like material, particularly pastries having a filler material such as processed fruit therein. A corollary object is that of providing a process for eliminating the slow and tedious manual operations normally attended to the preparation of these materials. The process of the invention introduces steps and techniques not previously known whereby the ultimate result is effectively realized automatically. The objects are realized thereby of economy, increased and more sanitary production without manual handling of the food materials.

The process involves delivery of the filler material to the conveyor by pump means; automatic dispensing of it onto the pastry dough, and automatic processing of the dough and filler to produce the desired product. An object of the invention is to integrate these steps into a unified process.

Another object is to provide a type of apparatus as described in the foregoing wherein the equipment for processing is readily movable to and away from the conveyor belt and positionable with respect to the moving belt so that the equipment is directly driven thereby.

Further objects reside in the provision of improved filler delivery and dispensing means and cutter means for the pastry product.

Further objects and additional advantages of the invention will become aparent from the following detailed description and annexed drawings wherein:

FIGURE 1 is an end view of apparatus of the invention shown in relation to a conveyor belt.

FIGURE 2 is a side elevatonal view of the apparatus of FIGURE 1;

FIGURE 3 is a plan view of the apparatus of FIGURES 1 and 2;

FIGURE 4 is a sectional view taken along the line 4—4 of FIGURE 3;

FIGURE 5 is a view taken along the line 5—5 of FIGURE 4;

FIGURE 6 is a sectional view taken along the line 6—6 of FIGURE 4;

FIGURE 7 is a view taken along the line 7—7 of FIGURE 6;

FIGURE 8 is a sectional view taken along the line 8—8 of FIGURE 6;

FIGURE 9 is a view similar to FIGURE 8 with the valve means in a different position;

FIGURE 10 is a view taken along the line 10—10 of FIGURE 6;

FIGURE 13 is a perspective view of the entire machine of the invention;

FIGURE 14 is a detail view;

FIGURE 15 is a sectional view taken along the line 15—15 of FIGURE 13.

Figure 11:
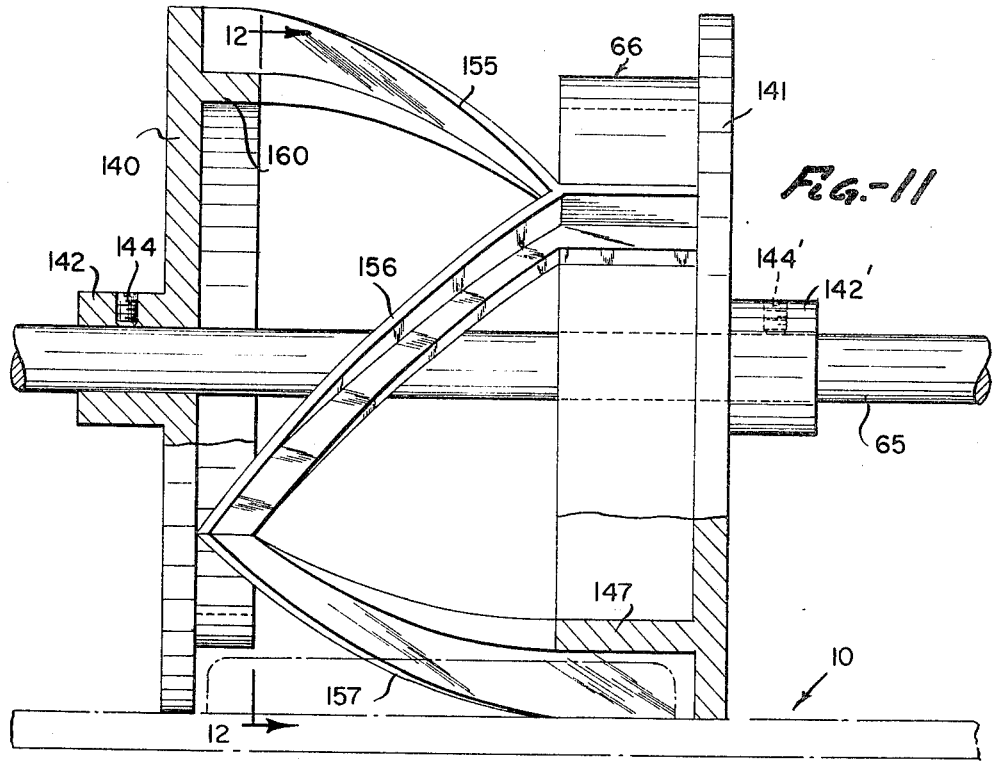
FIGURE 11 is a detail view of the cutter rotor.

Referring now in more detail to FIGURES 1 to 5 and 13 to 15 of the drawings, numeral 10 designates a standard or conventional endless belt forming part of a conveyor system shown in outline in FIGURE 13. The conveyor comprises a platform 11 having downwardly extending side flanges 13 and 15. The upper reach of the endless conveyor belt 16 passes along the platform 11. The platform 11 may be supported by uprights, as shown in outline at 18 in FIGURE 13. The endless belt 16, as known conventionally in conveyors, passes over rollers at the ends which are on shafts journaled in suitable support means which may be the side flanges 13 and 15. These rollers are driven by a motor 20 by means of sprockets and sprocket chain enclosed in a housing 21; see FIGURE 13. The invention herein does not reside in the conveyor means itself, which may be of a standard commercial make.

The processing equipment of the invention as set forth in the foregoing is such that it may be movable up to the conveyor belt 10, as shown in FIGURE 13 and the automated equipment is then driven by the moving belt.

The equipment comprises a rectangular frame 24 having downwardly extending legs 25 on the ends of which are casters as designated at 26 to facilitate moving the frame about. The frame has a pair of upwardly extending legs 30 and 31 which are pivotally attached to the rectangular frame 24 by pivot pins, as designated at 33 in FIGURE 15. The uprights 30 and 31 carry a frame assembly including a longitudinally extending frame member 35. The position of the pivoted frame assembly is controlled partly by brace members 37 and 38 which are pivotally attached at one end to the uprights 30 and 31, respectively, by brackets 36 and 39. At the other end, these members are pivotally attached to brackets 40 and 41 on transverse members of the rectangular frame 24. Disposed on the brace members 37 and 38 are coil springs 43 and 44 bearing against collars 45 and 46 to exert a biasing effect with respect to the pivotal position of the pivoted frame assembly.

Carried on the longitudinal frame member 35 is an upright member 50 having a configuration as shown in FIGURE 13 and forming a part of a further frame assembly including a transverse frame member 51 and a similar end frame member 50'; see FIGURE 5. Extending longitudinally from the frame member 51 are further frame members 53 and 53' having downwardly extending legs 54 and 54' which support a pair of circular clamping members 55 and 55'. Removably carried by these clamping members is a rotary valve 57 which will be described in detail presently. The clamping members may be clamped by wing nuts as shown at 58 in FIGURE 4.

Numeral 60 designates a further longitudinal frame member similar to the frame member 35. The end frame member 50' is attached to the longitudinal frame members 60. Numerals 62 and 62' designate an additional pair of upright frame members upstanding from the frame members 35 and 60 and having a configuration as shown in FIGURE 13. Supported by these frame members are end members 63 and 63' providing journals for the ends of a transverse shaft 65 on which is mounted the rotary cutter 66 which will be described in detail presently. It may be observed, however, that the reel or rotary cutter 66 is in a position over or on the moving belt 16 so that it may be driven thereby.

The rotary valve 57 has a rotatable valve element within it which is on a shaft 70, the ends of which are journaled in pedestal bearings 71 and 71' which are attached to the upright frame members 50 and 50'. On one end of this shaft is a sprocket wheel 73 which by means of a sprocket chain 74 is driven by a further sprocket wheel 76 on the end of shaft 78. The shaft 78 is journaled in mounting members 79 and 79' carried by the upright support members 50 and 50'. On one end of the shaft 78 is a bevel gear 81 meshing with a bevel gear 82 on the end of a longitudinal shaft 83 supported in pedestal bearings 84 and 84' supported by the upright members 50 and 62. On the other end of shaft 83 is another bevel gear 87 meshing with a bevel gear 88 on the end of shaft 65. As may be seen, therefore, the shaft 65 can drive the shaft 83 which in turn drives the shaft 78. This shaft, by means of the sprocket wheels 73 and 76 and the sprocket chain 74, drives the rotary element of the rotary valve 57. On the shaft 78 is a disc 91 having extending fingers 92 which engage with a strip of dough 93 which is carried along by the conveyor belt 16. These fingers punch depressions in the dough at spaced points, as shown in FIGURE 3, which pass underneath the discharge openings of the rotary valve 57, as will be described in detail presently, so that the filler material, which is dispensed or discharged is received in the openings or depressions in the dough.

From the foregoing it may be observed that the machine or equipment may be moved up to the conveyor with the pivoted frame placed in position over the upper reach 16 of the conveyor belt. The upper frame assembly may then be latched in position with respect to the platform 11 of the conveyor by means of pins such as 95 passed through an extending flange 96 on the upright frame members 50 and 62' and extending into openings in the flange 15, as shown in FIGURE 1.

Numeral 100 designates a positive displacement pump driven by a motor 101, these elements being mounted on a platform 102 which may be disposed at any convenient location. Numeral 105 designates a conical feeding hopper for feeding the filler material to the positive displacement pump 100. The rotary valve 57 has a tapered inlet part 106 having a disconnectable fitting 107 for attaching a flexible hose 108 to it. The other end of this flexible hose 108 is connected to the discharge outlet 110 of the positive displacement pump 100.

The rotary dispensing valve 57 is shown in detail in FIGURES 6 to 10. It comprises a cylindrical body 115 having a cylindrical bore 116 and end rings 117 and 118 adapted to be received in the clamping devices 55 and 57. The end rings have counterbores 120 and 121 which receive circular end closure fittings or bushings 123 and 123'. These end members have bores 124 and 124' in which are received flanged shaft bearings 125 and 125' and bushings 126 and 126'.

The rotary valve element is a cylindrical element 130 having transverse bores 131 and 132, the axes of which are normal to each other. These bores or ports are spaced from each other, but both are adapted to communicate with the larger end of the tapered neck 106 on the body 115 of the valve. The upper end of the tapered neck 106 is threaded, as shown at 133, to be connected to the disconnectable fitting 107 previously described. The shaft 78 previously described is in two parts which pass through the bearings 125 and 125' and the ends are threaded into the rotary element 130. The housing 115 has discharge or dispensing ports 135 and 136 which are alternately registerable with the ports or bores 131 and 132.

From the foregoing, the operation of the rotary valve or dispensing device 57 will be apparent to those skilled in the art. The shaft or shafts need merely be rotated to cyclically or alternately position the bores or ports 131 and 132 so that the tapered neck 106 cyclically or alternately is brought into communication with the discharge or dispensing ports 135 and 136. In this manner, the filler material is fed alternately to the holes or depressions in the dough made by the fingers on the disc 91 as illustrated in FIGURE 3.

Figure 12:
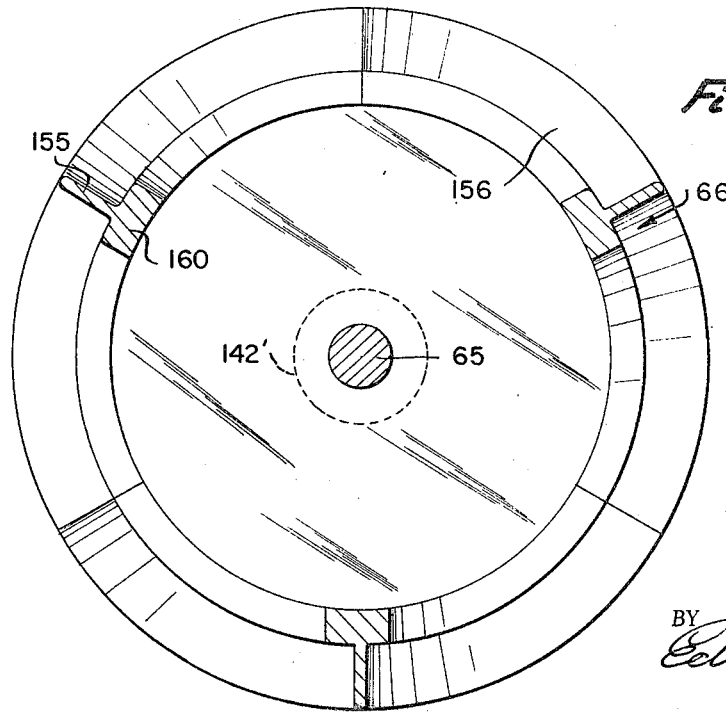
FIGURE 12 is a sectional view taken along the line 12—12 of FIGURE 11.

The rotating reel or cutter 66 is shown in detail in FIGURES 11 and 12. It comprises circular end members or discs 140 and 141 having hubs or collars 142 and 142' through which the shaft 65 passes, the shaft being held by set screws in the hubs as shown at 144 and 144'. The end disc 141 has an inwardly extending circular flange 147. The cutter has a group of angularly spaced curved blades so positioned as to make alternate diagonal cuts in a strip of pastry dough 150 as indicated at 151 in FIGURE 3. Such curved blades are designated at 155, 156 and 157 in FIGURE 11. The disc 140 has inwardly extending members as shown at 160 spaced from the periphery to which one end of the curved blades is integrally attached, as shown in FIGURE 12. Ends of adjacent blades such as 155 and 156 are joined as shown in FIGURE 11 and integrally attached to the cylindrical flange 147.

As may be seen in FIGURES 11 and 12, the rotor 66 is brought into direct engagement with the conveyor belt 116 when the equipment is moved up to it and the upper pivoted frame brought down and attached, as previously described. There is sufficient friction between the rotor 66 and the conveyor belt that the moving belt drives the rotor and the shaft 65. This in turn drives the shafts 83, 70 and 78, as previously described. The disc 91 and its fingers punch the dough 93 before it passes underneath the dispensing valve, which dispenses the filler material alternately through its discharge apertures and into the depressions in the dough, as described.

When the machine is used for the preparation of apple turnovers, a strip of dough is fed in on the conveyor having a width such as indicated at 163 in FIGURE 3. This strip of dough passes underneath the disc 91 and the dispensing valve 57 with the filler material being dispensed or fed into the depressions in the dough. In the form of the machine shown an operator is present while the machine is operating, and he folds one side of the strip of dough over the depressions having filler material in them to provide a narrowed strip as indicated at 164, which passes underneath the cutter 66. The cutter 66 then makes the alternate diagonal cuts, as shown at 151, so that prepared triangular or pie-shaped turnovers are provided for which are then immediately ready to be passed into a baking oven. It may be seen, therefore, that the pastry is prepared in a way so as to eliminate the tediousness and waste of time that has been involved in preparing these products in the past.

From the standpoint of the process involved, pastry products of this type in the past have been prepared by hand, not using the process or technique described herein. For example, with respect to apple turnovers, the filler material has been placed on the dough by hand and the materials then further processed by hand by way of being folded and cut into individual pieces. Such processing is tedious and time-consuming and necessarily makes the product more expensive and less sanitary. The process of this invention makes it possible to produce this type of pastry product much more rapidly so that it can be sold at a lower price. By the process of this invention, the dough itself may be fed into the conveyor mechanically, if desired. The filler material is of a consistency such that it can be pumped. The process therefore involves the steps of pumping or delivering the filler material from a source of supply and mechanically dispensing it onto the dough. For apple turnovers, the dispensing is intermittent into, or onto spaced depressions in the dough which are automatically formed by a rotor in a predetermined pattern. This forming step precedes the dispensing step. After the dispensing step, the dough and filler material move along the conveyor to a further station for further processing. This includes, for apple turnovers, the folding over of the dough material as described in the foregoing, and then the automatic cutting along diagonal lines of the dough to form the individual pieces or articles which are the apple turnovers. From the foregoing, it will be observed that the invention provides certain new processing steps and integrates them so that the final desired pastry product results from the process in the manner described.

From the foregoing, those skilled in the art will observe that the invention as described herein achieves and realizes all of the objects and advantages as stated in the foregoing, as well as having many additional advantages which are apparent from the detailed description.

The apparatus does not have to have a power source of its own. It is readily movable up to any suitable conveyor in a position to cooperate therewith and be driven thereby. The operation of the filler-dispensing mechanism is extremely simplified, as well as is the cutter mechanism. The equipment is easily moved to other areas as for cleaning or maintenance, and is of a very positive acting and effective nature.

The foregoing disclosure is representative of a preferred form of the invention and is to be interpreted in an illustrative rather than a limiting sense, the invention to be accorded the full scope of the claims appended hereto.

We claim:

1. In a machine for preparing pastry products having a filler therein, means comprising a movable frame carrying pastry preparing mechanism, said frame being movable into a position wherein the said mechanism is cooperable with a conveyor having an endless belt, said frame having a relatively movable section carrying at least a part of said mechanism cooperable with said endless belt, said mechanism including a rotating member positioned when the mechanism is in operative relationship to engage the conveyor belt to be driven thereby, said mechanism comprising dispensing means positioned to feed a filler material onto dough carried by the said conveyor belt at a location ahead of said rotatable member, said dispensing means comprising a rotatably driven dispensing valve operable cyclically to intermittently discharge filler material, means whereby the said valve is driven by the said rotating member, and power driven means for feeding filler material to said valve.

2. In a machine for preparing pastry products having a filler therein, means comprising a movable frame carrying pastry preparing mechanism, said frame being movable into a position wherein the said mechanism is cooperable with a conveyor having an endless belt, said frame having a relatively movable section carrying at least a part of said mechanism cooperable with said endless belt, said mechanism including a rotating member positioned when the mechanism is in operative relationship to engage the conveyor belt and to be driven thereby, said mechanism comprising dispensing means positioned to feed a filler material onto dough carried by the said conveyor belt at a location ahead of said rotatable member, said dispensing means comprising a rotatably driven dispensing valve operable cyclically to intermittently discharge filler material, means whereby the said valve is driven by the said rotating member, said valve comprising a housing having an inlet port and having a pair of spaced outlet ports, a rotatable cylindrical member in the housing having apertures extending therethrough communicable with the inlet port and with the outlet ports, and means for continuously rotating the said cylindrical member to cyclically bring the inlet port successively into communication with the outlet ports.

3. In apparatus for preparing pastry products, a machine adapted for use with a conveyor having a moving horizontal run, said machine comprising a stand which is movable to a position in close proximity to the conveyor, said stand carrying a frame which is movable relative thereto into a position directly overlying the conveyor, said frame carrying pastry preparing mechanism cooperable with dough carried along on the horizontal run of the conveyor, said mechanism comprising means for delivering a pastry ingredient onto the conveyor, and supply means for delivering said ingredient to the delivery means from a source.

4. Apparatus as in claim 3 wherein said mechanism comprises a rotor carried by the frame and engageable with the horizontal run of the conveyor when the frame is in position over the conveyor, and means whereby the rotor drives the pastry preparing mechanism.

5. An apparatus as in claim 4 wherein said rotor is in the form of a cutter for dividing the material on the conveyor into individual products.

6. An apparatus as in claim 4 wherein said delivery means comprises a rotatably driven dispensing valve operable cyclically to intermittently discharge a pastry ingredient and means whereby the said valve is driven by the said rotor.

7. Apparatus as in claim 4 including a rotor means for providing spaced depressions in dough carried along on the conveyor and means whereby said rotor means is driven by said rotor engaging the horizontal run of the conveyor.

8. Apparatus as in claim 3 wherein said stand has a part movable into a position underneath the conveyor, said stand having uprights at the side thereof and said frame being hinged to said upright, where it can be moved about its hinged mounting into a position over the conveyor.

9. Apparatus as in claim 6 including rotor means for providing spaced depressions in dough carried along on the conveyor and means whereby said rotor means is driven by said rotor engaging the horizontal run of the conveyor.

References Cited by the Examiner

UNITED STATES PATENTS

| | | |
|---|---|---|
| 1,945,755 | 2/1934 | Scruggs. |
| 1,993,393 | 3/1935 | Willshaw et al. _____ 83—339 X |
| 2,030,598 | 2/1936 | Liles _____ 107—1 X |
| 2,158,910 | 5/1939 | Pellar _____ 107—1 |
| 2,434,339 | 1/1948 | Stiles _____ 107—69 X |
| 3,112,713 | 12/1963 | Jahn _____ 107—1 |
| 3,167,032 | 1/1965 | Rhodes _____ 107—4 |

FOREIGN PATENTS 567,142   12/1923   France.

WALTER A. SCHEEL, *Primary Examiner.*

J. SHEA, *Assistant Examiner.*